United States Patent [19]

Gupta et al.

[11] Patent Number: 4,629,589

[45] Date of Patent: Dec. 16, 1986

[54] BEVERAGE DISPENSER SYSTEM SUITABLE FOR USE IN OUTER SPACE

[75] Inventors: Ashis S. Gupta, Marietta; Richard H. Heenan, Atlanta; William S. Credle, Jr.; Robert W. Burke, II, both of Stone Mountain; Albert J. Cahen, Jr., Roswell, all of Ga.

[73] Assignee: The Coca-Cola Company, Atlanta, Ga.

[21] Appl. No.: 623,125

[22] Filed: Jun. 22, 1984

[51] Int. Cl.[4] .............................................. B01D 47/00

[52] U.S. Cl. .................................... 261/34.1; 261/74; 261/81; 261/DIG. 7; 222/129.1

[58] Field of Search ............... 222/129.1, 129.2, 129.3, 222/129.4, 146.1, 146.2, 146.6; 261/DIG. 7, 81, 74, 34 R; 415/120, 206, 203; 417/71, 72, 472, 474

[56] References Cited

U.S. PATENT DOCUMENTS

| | | | |
|---|---|---|---|
| 4,173,296 | 11/1979 | Marshall | 222/129.1 |
| 4,252,254 | 2/1981 | Pryor | 222/129.1 X |
| 4,356,937 | 11/1982 | Simon et al. | 222/129.2 |
| 4,384,512 | 5/1983 | Keith | 222/146.1 X |
| 4,445,539 | 5/1984 | Credle | 137/614.03 |
| 4,482,509 | 11/1984 | Iannelli | 222/129.1 X |

FOREIGN PATENT DOCUMENTS

| | | | |
|---|---|---|---|
| 392406 | 9/1965 | Switzerland | 261/DIG. 7 |

*Primary Examiner*—Joseph J. Rolla
*Assistant Examiner*—David H. Bollinger
*Attorney, Agent, or Firm*—Birch, Stewart, Kolasch & Birch

[57] ABSTRACT

A post-mix beverage dispenser comprising: a sub-system for making and dispensing a chilled, carbonated beverage from syrup concentrate; a sub-system for making and dispensing a chilled, still beverage from flavor concentrate; and a sub-system for making and dispensing a hot beverage from either concentrate or powder. Each of the concentrates for the respective sub-systems are provided in bag-in-box supply packages of a conventional type. Also included are two carbonator designs for operating under zero gravity conditions without forming a gaseous phase within the carbonator tanks thereof. The first of these unique carbonators is a batch carbonator and the second is a continuous carbonator.

The batch carbonator includes an outer rigid shell and an accordian-type inner container which contracts or expands when fluids are dispensed or introduced. The continuous carbonator has a rotary agitator including a plurality of radial vanes in a carbonation chamber which includes an outer toroidal-shaped chamber and an inner cylindrical chamber.

7 Claims, 7 Drawing Figures

BEVERAGE DISPENSER SYSTEM SUITABLE FOR USE IN OUTER SPACE

BACKGROUND OF THE INVENTION

The present invention relates to a post-mix beverage dispenser system suitable for use in outer space in the controlled environment of a space station. More specifically, the present invention relates to a post-mix beverage dispenser system capable of producing cold, carbonated beverages; chilled, citrus-flavored, still beverages, and hot beverages such as coffee, tea and cocoa.

The operation of a post-mix beverage dispenser in outer space presents some unique problems which are not encountered on earth. Most significant is the absence of gravity because under zero gravity conditions there is no natural separation of gaseous and liquid phases within containers, such as carbonators or drinking cups. Therefore, there is no headspace formed within these containers from air or carbon dioxide as there would be on earth. In addition, these containers in the controlled environment of a space station or the like in outer space, are often subjected to temperatures in excess of 100° F. (37.8° C.) and they must be able to withstand lift-off and landing conditions of space carft. Furthermore, it is imperative in the environment of a space station to control the pressure of carbonated beverages so that they do not exceed two to three p.s.i. in order to assure comfortable beverage consumption by astronauts. Accordingly, a need in the art exists for a post-mix beverage dispenser system which operates satisfactorily under the above unique conditions and any other conditions which may be encountered in the controlled environment of a space station.

SUMMARY OF THE INVENTION

It is a primary object of the present invention to provide a post-mix beverage dispenser system which will operate in the zero gravity conditions of outer space.

It is another object of the present invention to provide a post-mix beverage dispenser including a carbonated beverage sub-system with a carbonator which prevents a gaseous phase from forming within the carbonator tank.

It is a further object of the present invention to provide a valve mechanism for a post-mix beverage dispenser suitable for use in a space station, for filling a drinking cup with beverage or dispensing the same without the creation of any gaseous phase within the cup.

It is still a further object of the present invention to provide such a valving mechanism which may be quickly connected to or disconnected from the drinking cup and which includes means therein for controlling the flow rate of beverage into or out of the cup.

It is yet another object of the present invention to provide a post-mix beverage dispenser suitable for use in outer space which is highly reliable and requires limited maintenance.

It is still another object of the present invention to provide a post-mix beverage dispenser for outer space which is self-sanitizing.

It is a further object of the present invention to provide a post-mix beverage dispenser for outer space which will function for at least ninety days without replenishing any of the ingredient supplies.

It is another object of the present invention to provide a post-mix beverage dispenser for outer space which will dispense from a single dispenser device, cold, carbonated beverages; still, cold beverages; and hot beverages such as coffee, tea or cocoa.

The objects of the present invention are fulfilled by providing a post-mix beverage dispenser comprising: a sub-system for making and dispensing a chilled, carbonated beverage from syrup concentrate; a sub-system for making and dispensing a chilled, still beverage from flavor concentrate; and a sub-system for making and dispensing a hot beverage from either concentrate or powder. Each of the concentrates for the respective sub-systems are provided in bag-in-box supply packages of a conventional type.

The present invention includes two unique carbonator designs for operating under zero gravity conditions without forming a gaseous phase within the carbonator tanks thereof. The first of these unique carbonators is a batch carbonator comprising a carbonation chamber including means for biasing the chamber toward a fully collapsed state of substantially zero internal volume; means for introducing water into the chamber of pressure sufficient to overcome the means for biasing to expand the chamber to the volume of water introduced; means for introducing carbon dioxide gas into the chamber to carbonate the same; and means for dispensing the carbonated water from the chamber. The carbonation chamber is an accordion-type container having flexible sidewalls with accordion-like folds therein and rigid end members which are biased towards each other by a coil spring. Because this chamber expands and contracts with the introduction and dispensing of water, no gaseous phase accumulates within the chamber.

A second embodiment of a unique carbonator suitable for operation under zero gravity conditions is a continuous carbonator comprising a generally cylindrical carbonation chamber having a central section and an outer annular section in fluid communication therewith; water supply means for introducing water to be carbonated into said central section; rotary impeller means in said central section for creating a centrifugal force which propels the water into the outer annular section; means for introducing carbon dioxide gas into the outer annular section to carbonate the water therein; and means for dispensing the carbonated water from the outer annular section.

The rotary impeller includes a plurality of radial vanes attached to a central rotary shaft. The central rotary shaft is journaled in flat end walls of the central section of the carbonator chamber and is driven by an electric motor attached thereto.

Carbonation within this device is made continuous by means of a liquid level detection means disposed in the outer annular chamber which senses the volume of water therein and controls the introduction of water into the central section of the chamber when the volume of water in the outer section drops below a predetermined minimum.

A unique, quick-disconnect valving system for filling and dispensing from beverage containers is provided for controlling the rate of flow of beverage into or out of a beverage container, suitable for use in the environment of a space station. This quick-disconnect coupling and associated valves are essentially the same as disclosed in U.S. Pat. No. 4,445,539 to Credle, issued May 1, 1984. However, the manner in which this quick-disconnect coupling and valve assembly are utilized to control fluid flow rate from a beverage container is unique to the present invention. That is, the quick-disconnect coupling and valve mechanism of this Credle patent are only part of a unique system and method developed for filling and dispensing from beverage containers in outer space, in accordance with the principles of the present invention.

BRIEF DESCRIPTION OF THE DRAWINGS

The objects of the present invention and the attendant advantages thereof will become more readily apparent by reference to the following drawings, wherein like reference numerals refer to like parts, and wherein.

DETAILED DESCRIPTION OF PREFERRED EMBODIMENTS

The multiple beverage dispensing system of the present invention is capable of operating in a space station under zero gravity conditions and dispensing cold carbonated beverage, cold citrus beverages and hot beverages. FIGS. 1 to 4 illustrate the sub-systems for producing the cold-carbonated, cold-still and hot beverages which are integrated into a common dispenser system having the capability of dispensing all forms of these beverages. The cold beverages to be dispensed can be carbonated beverages such as COCA-COLA, and DIET COKE, or still (non-carbonated) beverages such as FANTA Orange and Fruit Juice (all of the above are registered trademarks of The Coca-Cola Company). The hot beverages may include coffee, cocoa or tea. In a preferred embodiment, the dispenser will have from four to six dispensing valves, capable of dispensing the cold or hot beverages on demand.

Figure 1:
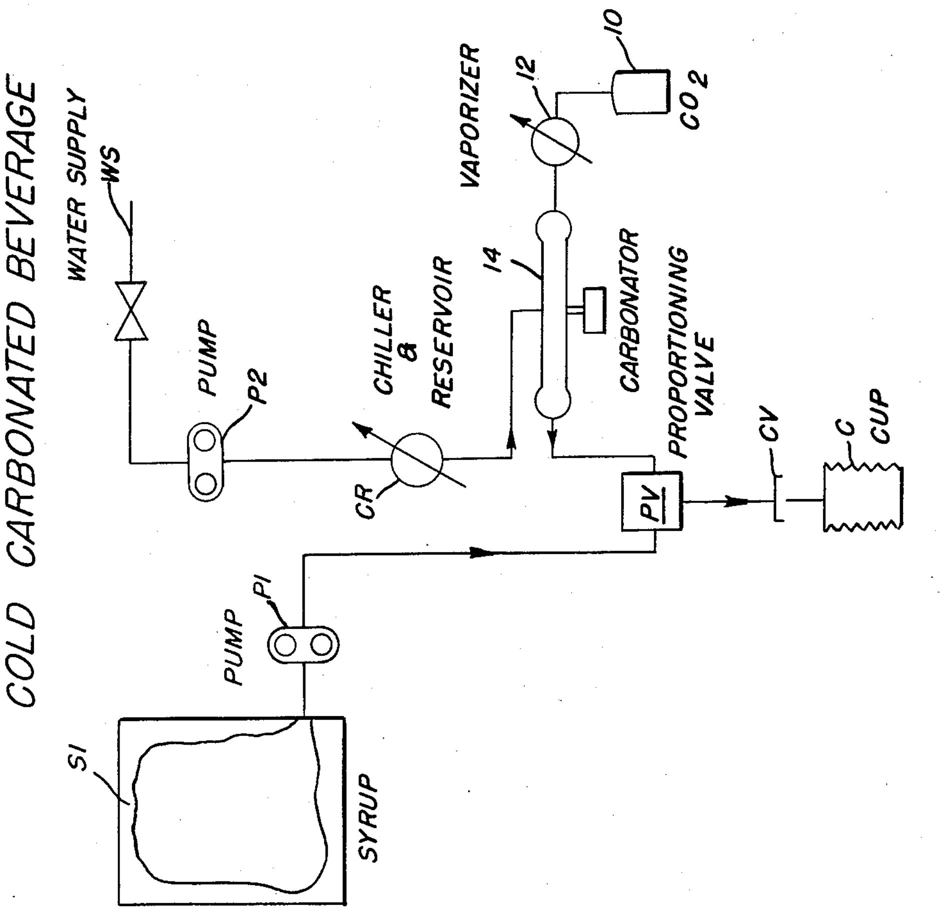
FIG. 1 is a schematic diagram of a sub-system of the dispenser of the present invention for making a cold, carbonated beverage.

FIG. 1 illustrates the sub-system for dispensing cold-carbonated beverages. Water is supplied from a water supply WS to a carbonator 14 through a chiller and reservoir CR, where it is mixed with CO2 gas from a cylinder 10 which passes through a vaporizer 12. Depending on the pressure of the water supply, a pump P2 may be required in order to draw water from the supply WS to the carbonator 14. Any suitable type of pump may be utilized such as the double-acting, gas-powered pump disclosed in U.S. Pat. No. 4,436,493 to Credle, issued Mar. 13, 1984. In the alternative, any suitable form of single- or double-acting electric pump may be utilized if desired. Flavor concentrate or syrup, such as COKE or DIET COKE syrup, is supplied from a bag-in-box package S1 of the type disclosed in U.S. Pat. No. 4,286,636 to Credle, issued Sept. 1, 1981. The syrup within package S1 is drawn therefrom by a double-acting pump P1, which may be of the identical type to the water pump P2, and in a preferred embodiment is the aforementioned pump of U.S. Pat. No. 4,436,493 to Credle. The carbonated water from carbonator 14 is mixed with syrup from package S1 in a proportioning valve PV in the proper ratios to form a cold-carbonated beverage. Any suitable proportioning valve may be utilized, such as that disclosed in U.S. Pat. No. 4,266,726 to Brown, issued May 12, 1981. The resulting post-mix beverage formed in the proportioning valve PV is then introduced through a quick-disconnect type of coupling valve CV into a suitable drinking cup C, to be described hereinafter with respect to FIG. 7. The quick-disconnect coupling valve CV may be of the type described in U.S. Pat. No. 4,445,539 to Credle, issued May 1, 1984.

The drinking cup C is preferably a disposable bag within a reusable, rigid outer bottle or container. This bottle is capable of being rapidly attached to the proportioning valve PV by use of the quick-disconnect coupling valve CV so that the disposable bag therein may be filled with carbonated beverage without forming a gaseous phase. The bottle or drinking cup must also be provided with a suitable pressure valve to facilitate proper flow rates into the container during filling and drinking by the user. Drinking or dispensing from the cup is conducted through a straw, to be described further hereinafter with reference to FIG. 7.

Cooling of the system of FIG. 1 in a preferred embodiment is provided by a vapor compression refrigeration system or any suitable type of thermoelectric refrigeration means. Thermoelectric refrigeration means can be provided for each of the syrup package S1, the chiller reservoir CR and the carbonator 14. The syrup from package S1 should be refrigerated at all times, and the carbonator temperature should be maintained in the range of 34° to 36° F.

Figure 2:
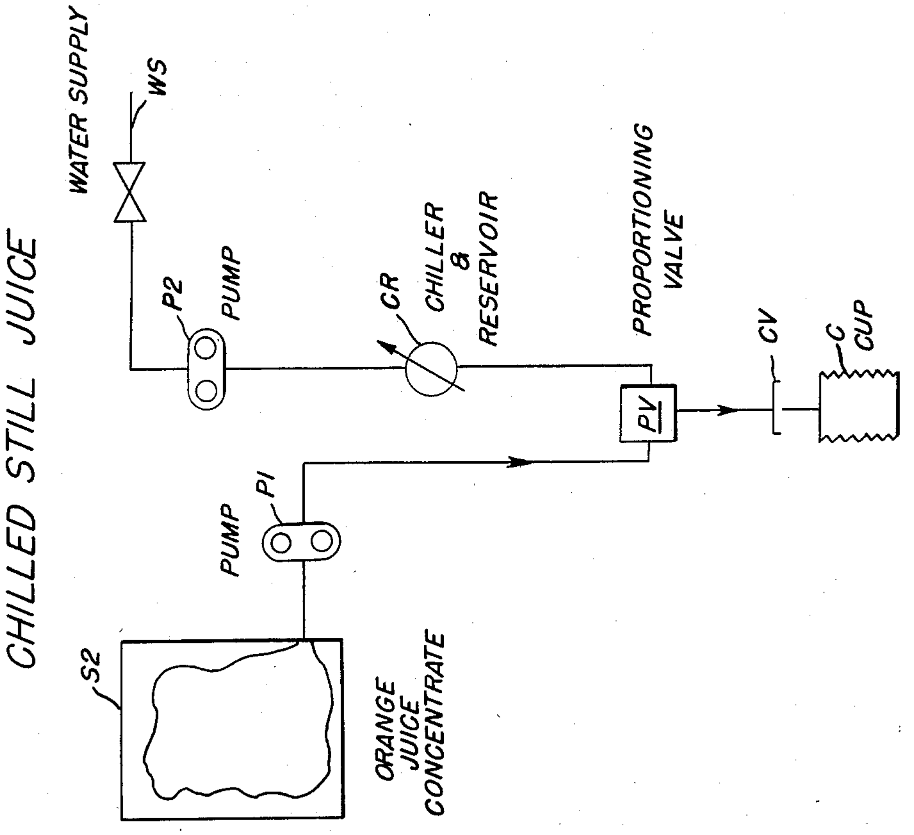
FIG. 2 is a schematic diagram of a sub-system of the dispenser of the present invention for making a chilled, still juice product.

The sub-system of the beverage dispenser of FIG. 2 for making a cold, still beverage such as an orange juice product is illustrated in FIG. 2. The system is essentially the same as the cold-carbonated beverage system of FIG. 1, absent the carbonator 14, and the substitution of an orange juice concentrate supply package S2 also of the bag-in-box type. It can be seen that the sub-system of FIG. 2 will operate in a similar fashion to the system of FIG. 1. That is, chilled still water and syrup concentrate will be mixed in the proper ratios in the proportioning valve PV and dispensed into the drinking cup C, as described hereinbefore with respect to carbonated water and syrup.

Figure 3:
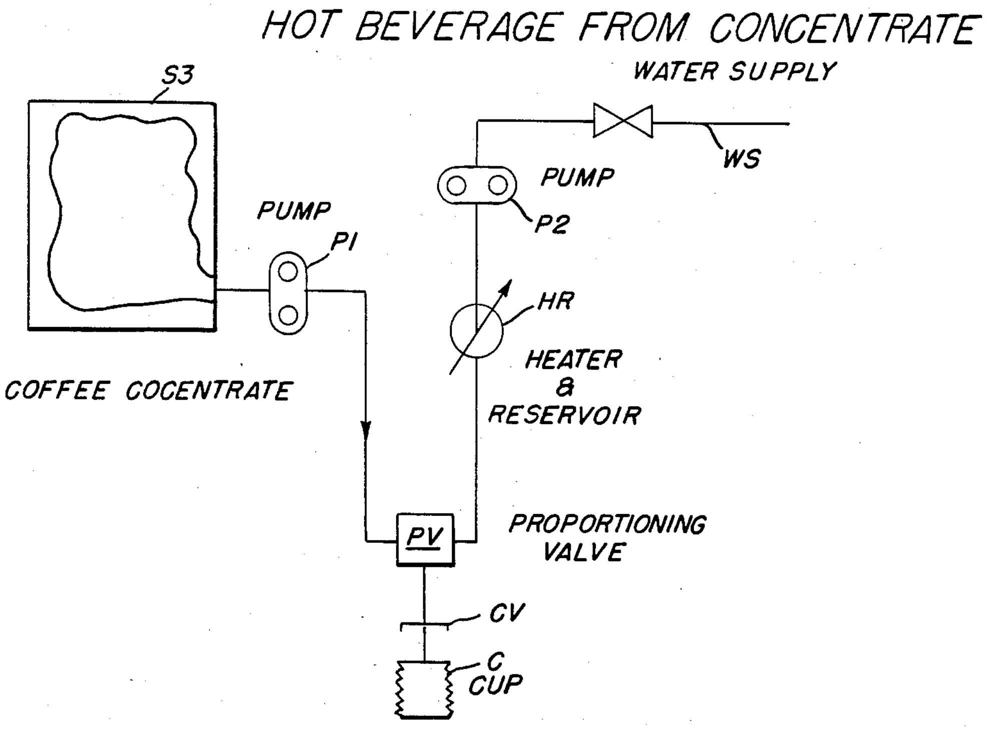
FIG. 3 is a schematic diagram of a sub-system of the dispenser of the present invention for making a hot beverage product from a concentrate.

The dispenser sub-system for producing a hot beverage from concentrate is illustrated in the schematic diagram of FIG. 3. It can be seen that the system of FIG. 3 is substantially identical to that of FIG. 2 with the exception that a heater and reservoir HR is substituted for the chiller and reservoir CR. Heating may be achieved by a submerged resistance heater. The concentrate supply is once again a bag-in-box type package S3, containing coffee concentrate, as illustrated in FIG. 3. It should be understood that other types of concentrates, such as cocoa, tea, etc. may be utilized for producing other types of hot beverages.

Figure 4:
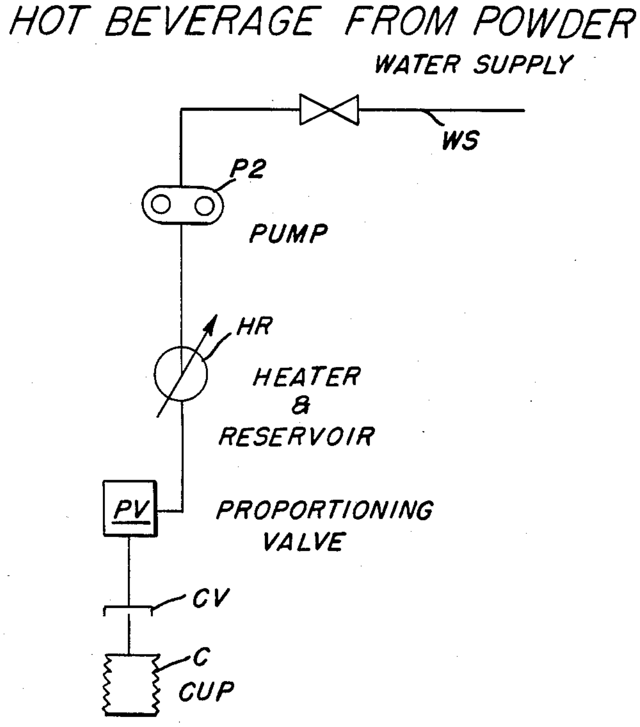
FIG. 4 is a schematic diagram of a sub-system of the dispenser of the present invention for making a hot beverage from a powder.

The dispenser of the present invention also provides for the production of hot beverages from powders with the sub-system illustrated in FIG. 4. In this sub-system, dried powder for coffee, tea or cocoa is contained within the cup C and the sub-system need only dispense hot water into the cup to dissolve the powder.

It should be understood that the sub-systems of FIGS. 1 to 4 are integrated into a common beverage dispenser including anywhere from 4 to 6 dispenser valves, to provide a single dispenser with the capability of dispensing cold-carbonated beverages, chilled-still beverages and hot beverages.

Figure 5:
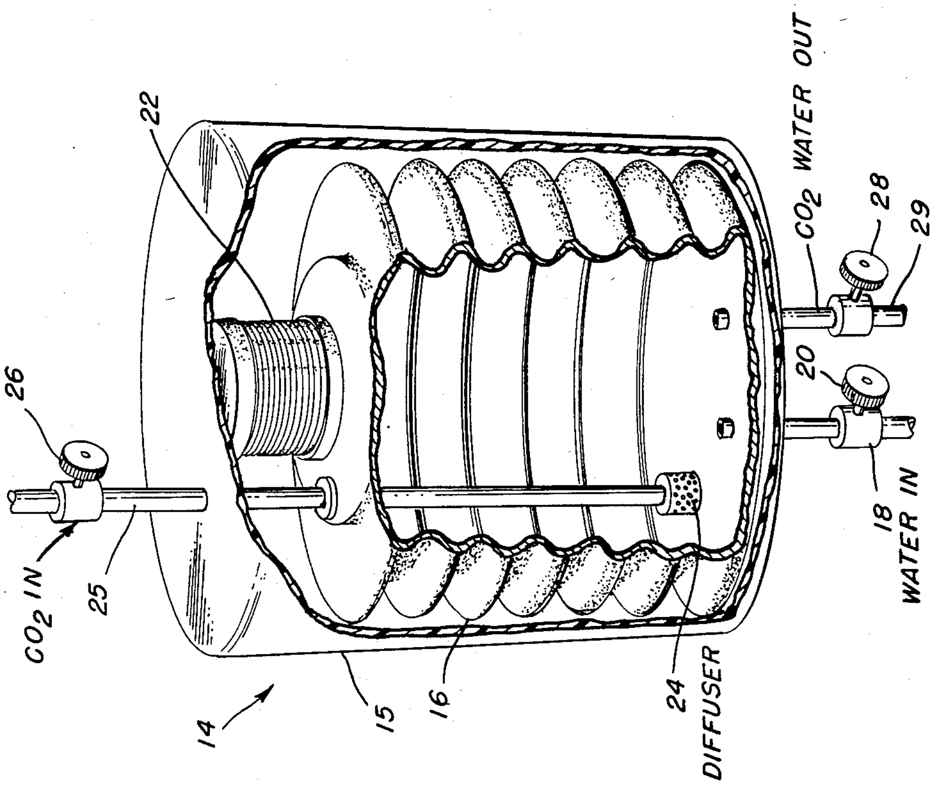
FIG. 5 is a perspective view partially in section of a batch carbonator suitable for use as a carbonator in the sub-system illustrated in FIG. 1.

Referring in detail to FIG. 5, there is illustrated a batch carbonator which may be utilized in the cold-carbonated beverage dispensing sub-system of FIG. 1. This carbonator 14 has a special construction to achieve carbonation of water under zero gravity conditions that would be experienced in space. This presents special problems because conventional carbonators used on earth use gravity to form the gas/liquid phase interface necessary to produce carbonated water. Because there is no gravity in space, there can be no controllable gas/liquid phase inteface, so the carbonator structure of FIG. 5 is designed to eliminate or preclude a gaseous phase from forming in the carbonator tank. This carbonator includes an outer, rigid shell or container 15 having an accordion-type inner container 16 which contracts or expands when fluids are dispensed therefrom or introduced therein. At the beginning of a carbonation cycle, the carbonator 14, including accordion container 16, will be fully compressed or collapsed by the spring 22 so that no headspace from air or CO2 can collect within the accordion-type container 16. That is, spring 22 will tend to bias accordion container 16 into a fully collapsed position or to the volume of the water contained therein, precluding the accumulation of any gas. Water is introduced through inlet 18 and accordion container 16 expands until the spring pressure P1 balances the water pressure in line 18. At that time, the water is shut off by valve 20. Carbon dioxide from line 25 is then slowly introduced through the diffuser 24 at a pressure $P1+\delta P$. Since there is no headspace or gravity within the accordion container 16, the CO2 gas will move about in the water therein until it is fully dissolved. When the desired amount of carbon dioxide has gone into solution, the carbon dioxide gas supply is shut off by valve 26. It should be noted that it may be preferable to have CO2 input line 25 pass through the bottom of carbonator 14 adjacent water line 18 rather than as illustrated in FIG. 5. This would eliminate the need for a seal between the moving top end of accordion 16 and pipe 25. The carbonated water can then be drawn out by opening valve 28 in the carbonated water output line 29. The accordion container 16 will then begin to collapse and the spring 22 will relax. When all carbonated water has been drawn out of the accordion container 16, and it is fully collapsed, it will be refilled with water and CO2 in the manner described hereinbefore. The introduction of CO2 gas into accordion container 16 can precede the introduction of water if desired.

It should be understood that although the batch carbonator of FIG. 5 has been described with respect to batch-type carbonation procedures, that two or more of the batch carbonators of FIG. 5 could be disposed in parallel and sequentially operated in order to achieve continuous carbonation, if desired.

Figure 6:
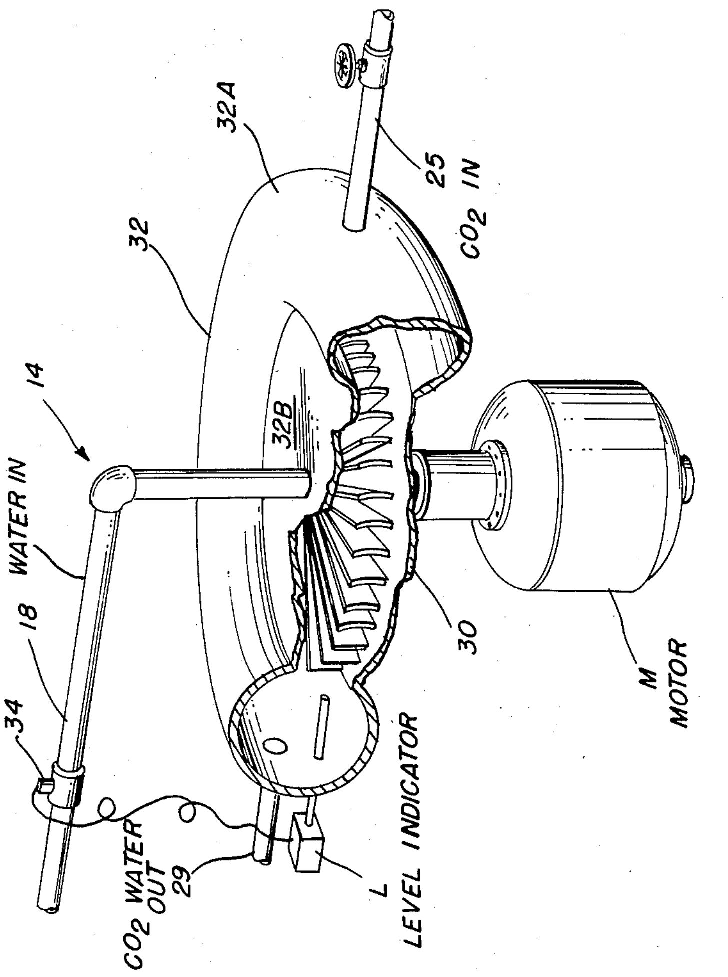
FIG. 6 is a perspective view partially in section of a continuous carbonator which may be utilized in the carbonated beverage sub-system of FIG. 1 as an alternative to the batch carbonator of FIG. 5.

However, a preferred embodiment of a continuous carbonator suitable for use with the cold-carbonated beverage sub-system of FIG. 1 is illustrated in FIG. 6. In the continuous carbonator of FIG. 6, the carbonation chamber 32 includes an outer toroidal-shaped chamber 32A and an inner cylindrical chamber 32B. Water is introduced into the central chamber 32B through a water input line 18. CO2 gas is introduced into the toroidal chamber 32A through an input line 25. Carbonated water formed in the chamber 32A is drawn off through carbonated water output line 29. The carbonator of FIG. 6 includes a rotary agitator 30, including a plurality of radial vanes and is driven by an electric motor M coupled to a central shaft thereof. The central shaft is journaled in the ends of chamber 32B and may be provided with magnetic sealing means. The motor M rotates the agitator 30 slowly, creating a swirling motion in the water within toroidal chamber 32A. Carbon dioxide gas entering chamber 32A through input line 25 will be forced to move toward the center of carbonation chamber 32 in the region of central cylindrical section 32B as the centrifugal force generated by agitator 30 pushes water outwardly into the annular chamber 32A. This creates a counter-current mixing of carbon dioxide gas and water which dissolves the carbon dioxide gas into the water. The pressure in the carbonation chamber 32 can be maintained at any desired level by adjusting the carbon dioxide pressure introduced through inlet 25. The operation of the carbonator of FIG. 6 can be made continuous by adding a control system including a liquid-level detecting device L. When the water level in carbonation chamber 32 falls below a predetermined point, such as the position of level indicator L, the water valve 34 in the water input line 18 is opened until the desired level is reached in chamber 32. At that time, additional carbon dioxide will be introduced through CO2 gas inlet line 25. The carbonation level may be adjusted by varying the temperature and pressure within the carbonation chamber 32 as desired.

Figure 7:
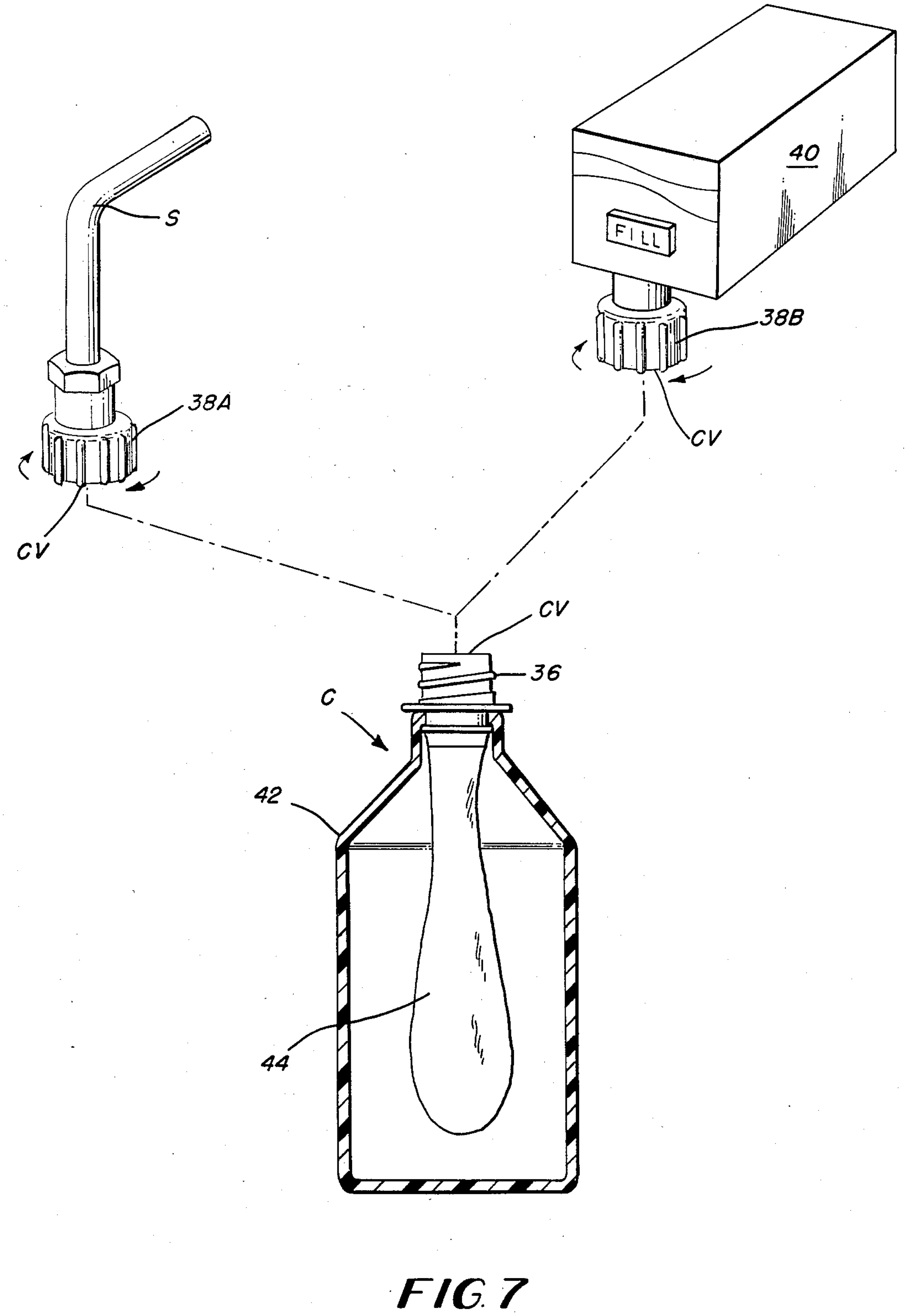
FIG. 7 is a diagrammatic illustration of a quick-disconnect coupling system for use with a drinking container.

A preferred embodiment of a cup C for use with any of the sub-systems of FIGS. 1 to 4 and associated quick-disconnect coupling valves CV are generally illustrated in FIG. 7. Other suitable containers are disclosed in a copending application Ser. No. 623,701 to the same inventors, filed June 22, 1984 and entitled "Beverage Containers Suitble For Use In Outer Space". The cup C includes an outer, rigid bottle 42 and elastic inner bag 44 which is disposable. In the condition illustrated in FIG. 7, the cup C and the inner bag 44 is empty. However, when the bag is filled, it will fully expand to the limits of the inner walls of the outer rigid bottle 42. By using an elastic bag, the cup C may be filled without developing any headspace when connecting it to a dispensing valve head 40 of any of the dispenser sub-systems of FIGS. 1 to 4 via the quick-disconnect coupling contained within threaded cap 38B which screws onto threads 36 of bottle 42. A suitable, quick-disconnect coupling valve for use as the valves CV in FIGS. 1 to 4 and 7 is described in U.S. Pat. No. 4,445,539 to Credle, issued May 1, 1984. This coupling and the associated fittings are best illustrated in FIGS. 1 and 10 of that patent.

In adapting the quick-disconnect coupling of the Credle patent for use in the dispenser of the present invention, each of the screw caps 38A and 38B coupled to the straw S and the dispenser valve head 40, respectively, are provided with a spring-biased, normally-closed valve similar to the valve 72 in FIG. 10 of the Credle patent. The cup C of FIG. 7 and the rigid outer bottle portion 42 are provided with another spring-biased valve in the neck portion of the bottle which is normally biased into a closed condition. This valve is similar to the valve 60 in the Credle patent. Accordingly, as either one of the caps 38A or 38B in the alternative are screwed onto the threads 36 of the rigid bottle 42, the respective spring-biased valves in the caps 38 and the bottle 42 open as the cap is screwed onto the bottle. The flow rate of liquid into or out of the cup C may be regulated by the degree to which the threaded caps 38 are screwed onto the container 42. That is, the valve poppet 62 of valve 60 of the Credle patent within the opening of container 42 opens in varying degrees, depending on how far cap 38 is screwed onto container 42.

Therefore, the cup C of FIG. 7, including the rigid outer container or bottle 42 and the inner elastic bag 44, may be filled through the dispensing head 40, which is coupled to the proportioning valve PV of any of the sub-systems of FIGS. 1 to 4 described hereinbefore, via the quick-disconnect coupling valves CV disposed within screw cap 38B and the neck of container 42. In the alternative, when it is desired to drink the beverage within the cup C, the user or astronaut will screw the cap 38A, including the straw S disposed in the top thereof, onto the neck of the container 42 until a comfortable flow rate of beverage out of the sack 44 is achieved. Therefore, FIG. 7 illustrates a preferred embodiment of the present invention for both filling the cup C and dispensing liquids therefrom for human consumption.

The accordion container 16, the outer carbonator tank shell 15, the chamber 32 of the continuous carbonator and the vanes of impeller 30 are all preferably fabricated from 3/16 inch stainless steel. The rigid outer bottle 42 of the beverage container may be polycarbonate and the inner elastic bag 44 may be gum or silicon rubber.

It should be understood that the system described herein may be modified as would occur to one of ordinary skill in the art without departing from the spirit and scope of the present invention.

What is claimed is:

1. A carbonator for producing carbonated water in a container without forming a gaseous phase therein comprising:

(a) a carbonation chamber including means for biasing the chamber toward a fully collapsed state of substantially zero internal volume;

(b) means for introducing water into said chamber at a pressure sufficient to overcome said means for biasing to expand said chamber to the volume of water introduced;

(c) means for introducing carbon dioxide gas into said chamber to carbonate the same; and (d) means for dispensing the carbonated water from said chamber.

2. The carbonator of claim 1, wherein said chamber has flexible sidewalls and rigid ends and said means for biasing is a spring which forces said sidewalls to collapse by pushing said rigid ends toward each other.

3. The carbonator of claim 2, wherein said flexible sidewalls have accordion-like folds therein and said spring is a coil spring.

4. A carbonator for producing carbonated water in a container without forming a gaseous phase therein comprising:

(a) a generally cylindrical carbonation chamber having a central section and an outer, annular section in fluid communication therwith;

(b) water supply means for introducing water to be carbonated into said central section;

(c) rotary impeller means in said central section for creating a centrifugal force which propels said water into said outer annular section;

(d) means for introducing carbon dioxide gas into said outer annular section to carbonate the water therein; and (e) means for dispensing the carbonated water from the outer annular section.

5. The carbonator of claim 4, wherein the central section of said chamber has flat end walls in which a rotary shaft of said impeller is journaled and said outer annular chamber is toroidal-shaped.

6. The carbonator of claim 5, wherein said impeller has a plurality of radial vanes disposed within said central section extending from said rotary shaft and said rotary shaft is coupled to a drive motor.

7. The carbonator of claim 4, further including liquid level detection means disposed within said outer annular chamber for causing said water supply means to introduce water into said central section when the volume of water in said outer annular section drops below a predetermined minimum.

* * * * *